G. R. Willmot,
Door Check.
Nº 32,020.      Patented Apr. 9, 1861.
Fig. 1    Fig. 2.
 
Fig. 3.
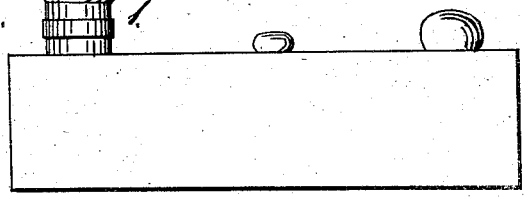
Fig. 4   Fig. 5.
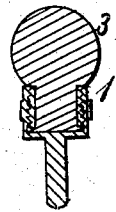 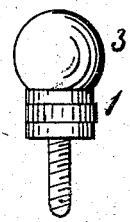
Fig. 7. Fig. 8. Fig. 9.
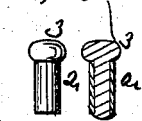 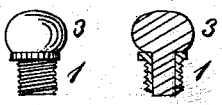
Fig. 6.
Fig. 10.
Witnesses:
H. James Weston
Thos. B. How
Inventor:
Geo. R. Willmot

UNITED STATES PATENT OFFICE.

GEORGE R. WILLMOT, OF WEST MERIDEN, CONNECTICUT.

HEAD FOR SCREWS AND TACKS.

Specification of Letters Patent No. 32,020, dated April 9, 1861.

*To all whom it may concern:*

Be it known that I, GEORGE R. WILLMOT, of West Meriden, in the county of New Haven and State of Connecticut, have invented an Elastic-Headed Screw or Tack, the construction and operation of which I have described in the following specification and illustrated in its accompanying drawings with sufficient clearness to enable competent and skilful workmen in the arts to which it pertains or is most nearly allied to make and use my invention.

My said invention consists in an elastic headed screw or tack made by drawing a piece of india rubber into a metallic ring in such a manner as to compress the rubber in the ring and cause its adhesion to the metal, while at the same time, the rubber which extends outside of the ring and forms the elastic head, is allowed to expand and give the proper size of material for the head, and the requisite elasticity also; the metallic ring while it secures the attachment of the rubber, also forming a shank or screw supported by the rubber from collapse, to attach the elastic headed screw or tack to any desired article, the rubber extending the entire length of the surrounding ring for the purpose of securing permanency, and the parts being constructed substantially in the manner hereinafter described.

In the accompanying drawings Figure 1 is a side view of a piece of rubber with the rings of metal before alluded to upon it, and ready to be cut into lengths preparatory to finishing the head. The rings represented in this view have a screwthread formed upon them. Fig. 2 is a like view of an elastic headed screw formed from one of the lengths, it being shown in this position and adjacent to Fig. 1 to give a more ready idea of the transition from the rubber rod or rope with the bands sprung upon it, to the finished article, ready for the market. Fig. 3 is a side elevation showing the heads of the screws and tacks as they appear when the shank is set into the article to which they may be affixed. Fig. 4 is a sectional elevation of one of the styles of the article, which I propose to construct for some of the purposes to which such an article is applicable. Fig. 5 is a side elevation of it. Fig. 6 is a side view of a tack constructed in a similar manner with the exception that there is no thread on the metal ring which surrounds the rubber. Fig. 7 is a sectional elevation of the same thing. Fig. 8 is a side view of one of the forms of elastic headed screw which I propose to make. Fig. 9 is a sectional view of it. Fig. 10 shows a similar screw with a metal socket fitted to it.

In the construction of this article of manufacture, the rings 1 and 2 are first prepared in the complete form in which they are to be used, before they are united to the rubber. This having been done, a cylindrical piece of rubber of the proper size to form the heads is taken, and one of the ends having been sufficiently reduced in size to allow the rings to be slipped on, and this last having been done, these ends are grasped with forceps or other suitable devices, and the rubber extended sufficiently far to so reduce its size as to allow the rings 1 or 2, as the case may be, to be slid into position with ease and facility. This having been done, the rubber is released from the forceps, when it assumes the form shown in Fig. 1, that portion within the rings expanding forcibly against them, by which the rubber is attached with sufficient permanence to answer the purpose for which it is intended, especially as the rubber when cut off forms a slight clench at the end of the ring farthest from the head, which with the adhesion of the rubber otherwise realized, secures its permanence of connection with the metal. The rubber 3 is then cut off near the end of each screw, and the head finished by turning in a lathe or otherwise, so as to form the screw head represented in Fig. 2, or one of any other form that may be desired. A very convenient screw for various purposes is thus provided, and by the modification shown in Figs. 4 and 5, a very neat thumb screw; delicate to the touch; well adapted to various purposes; and when covered with flock or other ornamental coating very beautiful in its appearance. In the construction shown in these Figs. 4 and 5 the rubber by bearing upon the disk to which the shank of the screw is attached, acts as a very efficient jam nut to prevent the parts when closely driven home from being easily turned on each other, thereby facilitating the operation of manipulating the thumb screw by means of the india rubber head.

Having thus fully described my said invention, I claim—

The screw or tack described as a new article of manufacture, when constructed in the manner described and involving the features of advantage and novelty set forth.

GEO. R. WILLMOT.

Witnesses:
H. JAMES WESTON,
THOS. P. HOW.